(12) United States Patent
Gallo et al.

(10) Patent No.: US 6,745,257 B2
(45) Date of Patent: Jun. 1, 2004

(54) METHOD, SYSTEM, AND PROGRAM FOR PROVIDING STATUS IN A MULTI-PROCESSING NODE SYSTEM

(75) Inventors: Frank David Gallo, Tucson, AZ (US); Brian Gerard Goodman, Tuscon, AZ (US); Leonard George Jesionowski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 511 days.

(21) Appl. No.: 09/754,445

(22) Filed: Jan. 4, 2001

(65) Prior Publication Data

US 2002/0087920 A1 Jul. 4, 2002

(51) Int. Cl.[7] .................................. G06F 3/00
(52) U.S. Cl. ................... 710/19; 710/15; 710/16; 710/17; 710/18; 710/62; 712/220; 709/201; 709/213
(58) Field of Search .............. 710/15–19, 62; 712/220; 709/201, 213

(56) References Cited

U.S. PATENT DOCUMENTS

| | | | |
|---|---|---|---|
| 5,197,055 A | | 3/1993 | Hartung et al. |
| 5,513,156 A | | 4/1996 | Hanaoka et al. |
| 5,659,708 A | * | 8/1997 | Arimilli et al. ............ 395/473 |
| 5,933,395 A | | 8/1999 | Dang et al. |
| 5,943,304 A | | 8/1999 | Kamada et al. |
| 5,956,301 A | | 9/1999 | Dimitri et al. |
| 5,991,245 A | | 11/1999 | Yoshimura |
| 6,023,643 A | | 2/2000 | Jesionowski |
| 6,044,442 A | * | 3/2000 | Jesionowski ............... 711/153 |
| 6,049,847 A | * | 4/2000 | Vogt et al. .................. 710/130 |
| 6,092,001 A | * | 7/2000 | Mizuno et al. .............. 700/116 |
| 6,115,804 A | * | 9/2000 | Carpenter et al. ............ 712/28 |
| 6,167,491 A | * | 12/2000 | McAlpine ................... 711/149 |

OTHER PUBLICATIONS

U.S. patent application Ser. No. 09/932,332, filed on Aug. 17, 2001, entitled, "Method, System, and Program for Handling Errors Occurring in Function Calls", invented by K.S. Goldsmith and R.G. Vining.

U.S. patent application Ser. No. 09/573,530, filed on May 19, 2000, entitled, "High Availability Work Queuing in an Automated Data Storage Library", invented by B.G. Goodman and L.G. Jesionowski, including Amendments to Claims dated Aug. 7, 2001.

U.S. patent application Ser. No. 09/573,531, filed on May 19, 2000, entitled, "Automated Data Storage Library Distributed Control System", invented by Goodman; L.G. Jesionowski; M.P. McIntosh; F. Quintana; C.A. Thompson, Jr.; and R. Yardy, including Amendments to Claims dated Aug. 16, 2001.

* cited by examiner

Primary Examiner—Jeffrey Gaffin
Assistant Examiner—Alan Chen
(74) Attorney, Agent, or Firm—David W. Victor; Konrad Raynes & Victor

(57) ABSTRACT

Provided is a method, system, and program for providing status information in a system comprised of multiple components. A first processing node receives status information indicating a state of a system component and generates a status message indicating the state of the system component. The first processing node transmits the status message to a second processing node. The second processing node updates information maintained by the second processing node with the state of the system component indicated in the status message. Status information maintained by the second processing node is returned to a request for status.

36 Claims, 5 Drawing Sheets

US 6,745,257 B2

METHOD, SYSTEM, AND PROGRAM FOR PROVIDING STATUS IN A MULTI-PROCESSING NODE SYSTEM

BACKGROUND OF THE INVENTION

1. Field of the Invention

The present invention relates to a system, method, and program for providing status in a multi-processing node system.

2. Description of the Related Art

An automated information storage and retrieval system, also known as an automated library, includes an array of storage cells, i.e., storage slots, that hold storage cartridges, such as optical or magnetic discs that are portable and removable from the library. The term "storage cartridge" as used herein refers to any structure for housing such removable information media known in the art. The library further includes one or more drives to read information from the storage cartridges located in the storage cells.

FIG. 1 illustrates an automated library 2, such as the International Business Machines Corporation ("IBM") 3995 Optical Library Dataserver, which is described in IBM publication "3995 ECKD Storage Administration Guide", document no. GA32-0242-02 (IBM Copyright, 1994), which publication is incorporated herein by reference in its entirety. The library 2 includes a controller, an input/output station, a gripper assembly 4 capable of picking up and inserting storage cartridges and an XY system 6 to move the gripper assembly 4 along the XY axis to a desired library element, such as storage slots 8a, b or drives 10a, b.

data operations are performed when the storage cartridge is inserted in the drives 10a, b. Once inserted in the drive 10a, b, data can be read from the cartridge and sent to a host processor. Data transmitted from the host processor can be written to the storage cartridge inserted in the drive 10a, b. The library controller includes a processor, RAM, and other controls and interfaces to direct the actions of the library components. The controller further interacts with a host processor to respond to library commands transmitted from the host processor. The input/output station is the opening through which the user may insert or remove a cartridge. An operator panel on the outside of the box housing the tape library 2 allows the user to communicate with the library controller. The library 2 also includes an access door 12 through which the user may add or remove cartridges maintained in the storage cells 8a, b.

The term "library element" as used herein refers to any location in the library 2 at which a storage cartridge may be located, e.g., the input/output stations, the storage cells 8a, b, the drives 10a, b, and gripper 4.

The gripper assembly 4 may also be equipped with a machine vision system, such as a bar code reader, to read a label on the storage cartridge when the gripper assembly 4 is positioned near a library element. The library controller records the identity and location information of the cartridges in a master status file to provide the status of library elements and the identity of storage cartridges at particular library elements.

In current implementations, the library controller would maintain element status information on all cartridges in the system and the library elements where they are located. Prior art library controllers must update status after performing a movement or operation concerning a cartridge. While managing the element status, the library controller must also execute requests received from hosts host systems and instruct the components of the tape library to execute the received request. The host systems may intermittently request the status information. In response to such requests, the library controller would transmit the status to the requesting host system. One drawback with this approach is that as tape libraries increase in size and as more host systems are attached, the library controller could be overburdened with requests to return status information, thereby interfering with general library controller operations.

Thus, there is a need in the art for improved techniques for maintaining and returning status information in the library system without overburdening the library controller.

SUMMARY OF THE PREFERRED EMBODIMENTS

Provided is a method, system, and program for providing status information in a system comprised of multiple components. A first processing node receives status information indicating a state of a system component and generates a status message indicating the state of the system component. The first processing node transmits the status message to a second processing node. The second processing node updates information maintained by the second processing node with the state of the system component indicated in the status message. Status information maintained by the second processing node is returned to a request for status.

In further embodiments, the state of the system component is capable of being altered by an electromechanical operation related to the system component.

In still further embodiments, the status information maintained by the second processing node is cached in a memory at the second processing node.

Yet further, the first and second processing nodes may communicate over a bus interface. The request for status is received from a computer system over a communication line and interface to the second processing node. The second processing node returns status information maintained by the second processing node over the interface and communication line to the computer system.

In further embodiments, the first processing node controls a storage library accessor capable of accessing a storage cartridge from one library element location, obtaining information on a state of the library elements, and moving a storage cartridge from one library element to another library element. The second processing node controls a communication interface providing access to a computer system over a communication line, wherein the second processing node returns requested status information to the computer system requesting the status information over the communication line.

Preferred embodiments concern an architecture for maintaining and returning status information in a multi-component system, such as a storage library, including multiple processing nodes that control system components. With the preferred embodiments, system status is communicated from a first processing node to a second processing node upon a state change at one system component. In this way, the status information maintained by the second processing node is current. Further, requests for status information from external systems can be serviced from a dedicated communication node. This arrangement alleviates processing burdens on a main controller node and further minimizes the effect of status host requests on the system bus interface interconnecting the processing nodes as the communication node communicates with the hosts via a separate port.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
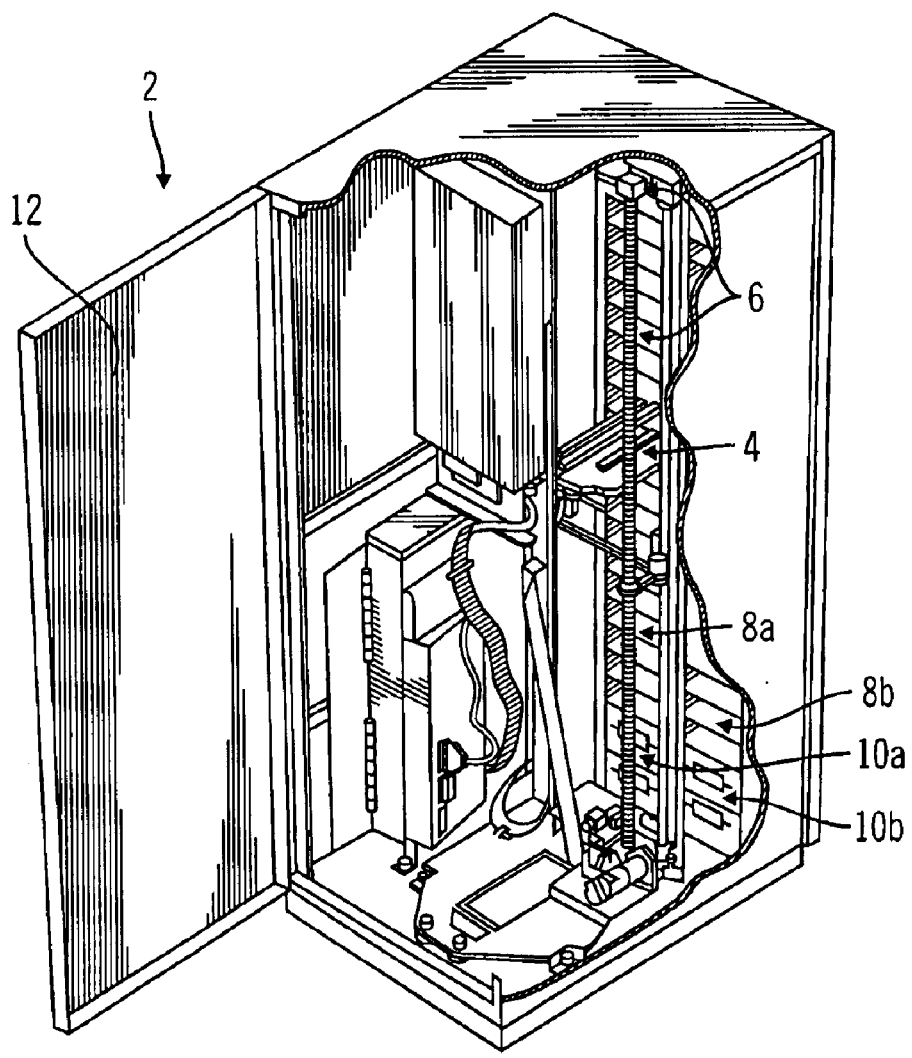
FIG. 1 is a block diagram illustrating components in a tape library system known in the art.
Figure 2:
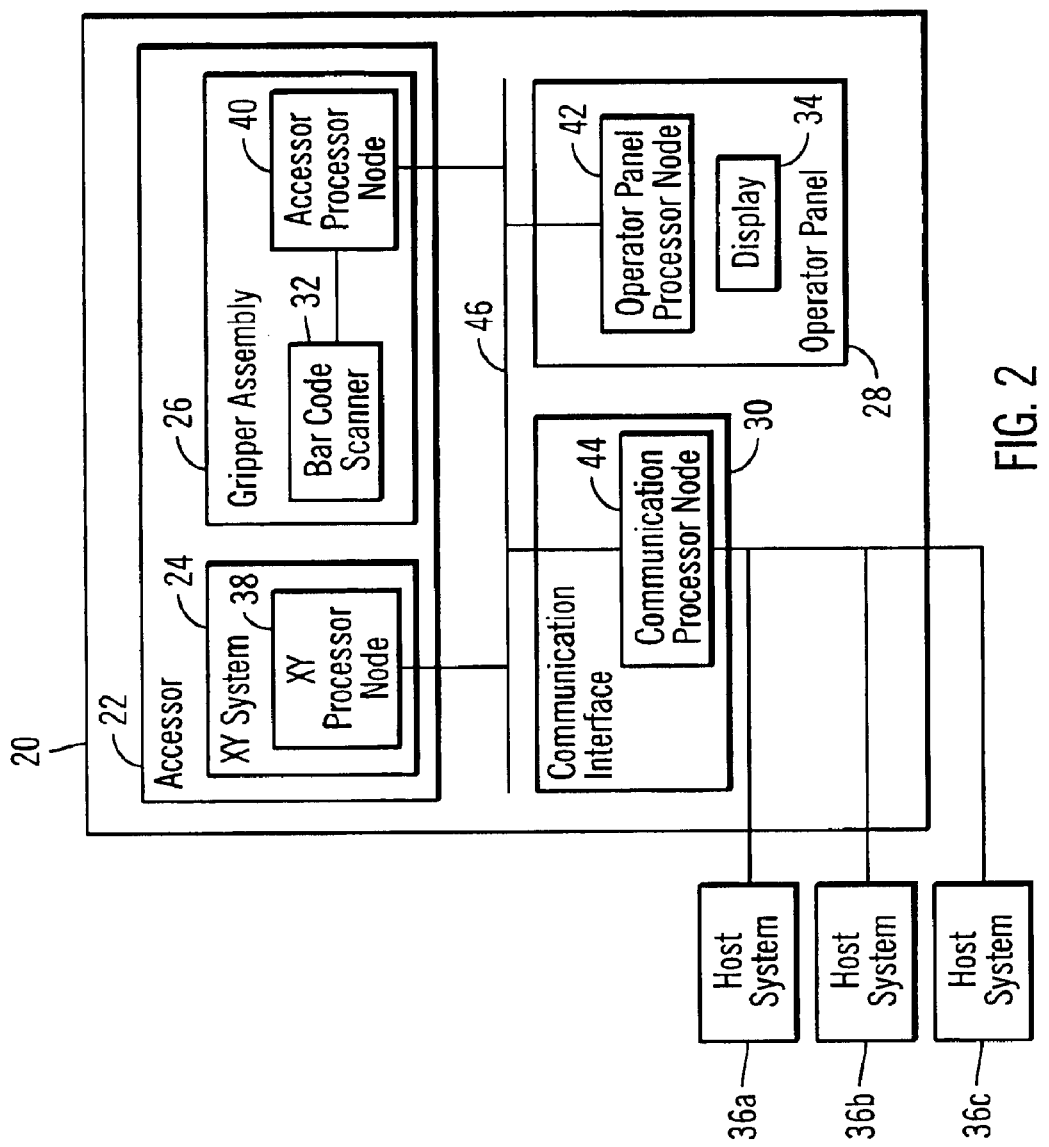
FIG. 2 illustrates an architecture of processor nodes in a storage library system in accordance with preferred embodiments of the present invention.

FIG. 2 illustrates the components of a storage library 20 in accordance with the preferred embodiments. The storage library 20 includes an accessor 22, which includes an XY system 24, a gripper assembly 26, an operator panel 28, and a communication interface 30. The XY system 24 includes servo-electronics to move the gripper assembly 26 in the horizontal "X" and vertical "Y" directions to position the gripper assembly 26, which includes a robotic hand or picker as shown as element 4 in FIG. 1, to an appropriate storage slot or drive, such as the storage slots 8a, b and drives 10a, b shown in FIG. 1. The gripper assembly 26 may remove or insert a storage cartridge from a storage slot or drive. The gripper assembly 26 further includes a bar code scanner 32 which can read identification labels on the storage cartridges. The operator panel 28 includes a display 34 to provide information to an operator and user interface controls to receive operator commands.

The communication interface 30 provides an interface to host systems 36a, b, c over a communication line, such as a network, serial interface, Small Computer System Interface (SCSI), etc. Additionally, the communication interface 30 may communicate with a separate web server or include an embedded web server to enable communication over a network, e.g., an Intranet, Local Area Network (LAN), the Internet, etc. The host systems 36a, b, c can communicate commands and receive data from the library 20 through the communication interface 30. In further embodiments, the host systems 36a, b, c may communicate with the library 20 through data storage drives (not shown).

In preferred embodiments, each of the storage library components 24, 26, 28, and 30 include a processor node, an XY processor node 38, accessor processor node 40, operator panel processor node 42, and communication processor node 44. Each processor node 38, 40, 42, and 44 comprises a processor, memory, firmware to control the processor, and a port to allow communication with a bus interface 46 through which the processor nodes can communicate. The bus interface 46 may comprise a controller area network (CAN) bus known in the art, which is a multi-drop network, having a standard access protocol and wiring standards. In alternative embodiments, the bus 46 may comprise any bus or communication interface known in the art. Each of the processor nodes 38, 40, 42, and 44 may either recognize a message identifier associated with each message on the bus interface 46, in accordance with the CAN protocol, or may be specifically addressed with each message, for example as is known in the SCSI bus standard.

With the above preferred embodiments, the components of the library system 20 function as distributed computing elements, each operating under the control of their respective processor node, which controls particular servo-electronics to perform system specific operations. In preferred embodiments, the accessor processor node 40 functions as the central processor to receive, queue, execute, or distribute host system 36a, b, c commands. Thus, the accessor processor node 40 provides central processing facilities, including workflow management and queuing. In preferred embodiments, the communication processor node 44 receives the host system 36a, b, c commands through the port and interface electronics provided by the communication interface 30 and transfers the commands to the accessor processor node 40 over the bus 46. The accessor processor node 40 can then execute such commands to control the gripper assembly 26 servo electronics to move the gripper assembly, or transfer XY motion commands to the XY processor node 38. The XY processor node 38 executes the commands to control the XY system 24 servo-electronics to move the accessor 22 in an XY direction through the tape library 20 to access a storage cartridge in a drive or storage slot. The host system 36a, b, c command can instruct the accessor 22 to read the identification label on the storage cartridge at a particular location, access a storage cartridge at one library element (e.g., drive, storage slot, gripper, I/O slot, etc.) and move the storage cartridge to another library element.

In further embodiments, the library system 20 may include redundant instances of the above components 22, 28, and 30 to improve the availability of the system and increase processing capabilities. The co-pending and commonly assigned patent applications "High Availability Work Queuing in an Automated Data Storage Library", having U.S. application Ser. No. 09/573,530, filed May 19, 2000 and "Automated Data Storage Library Distributed Control System", having U.S. application Ser. No. 09/573,531, filed May 19, 2000, which are both incorporated herein by reference in their entirety, describe further details of a tape library system including distributed processor nodes to implement the components of the tape library system.

Figure 3:
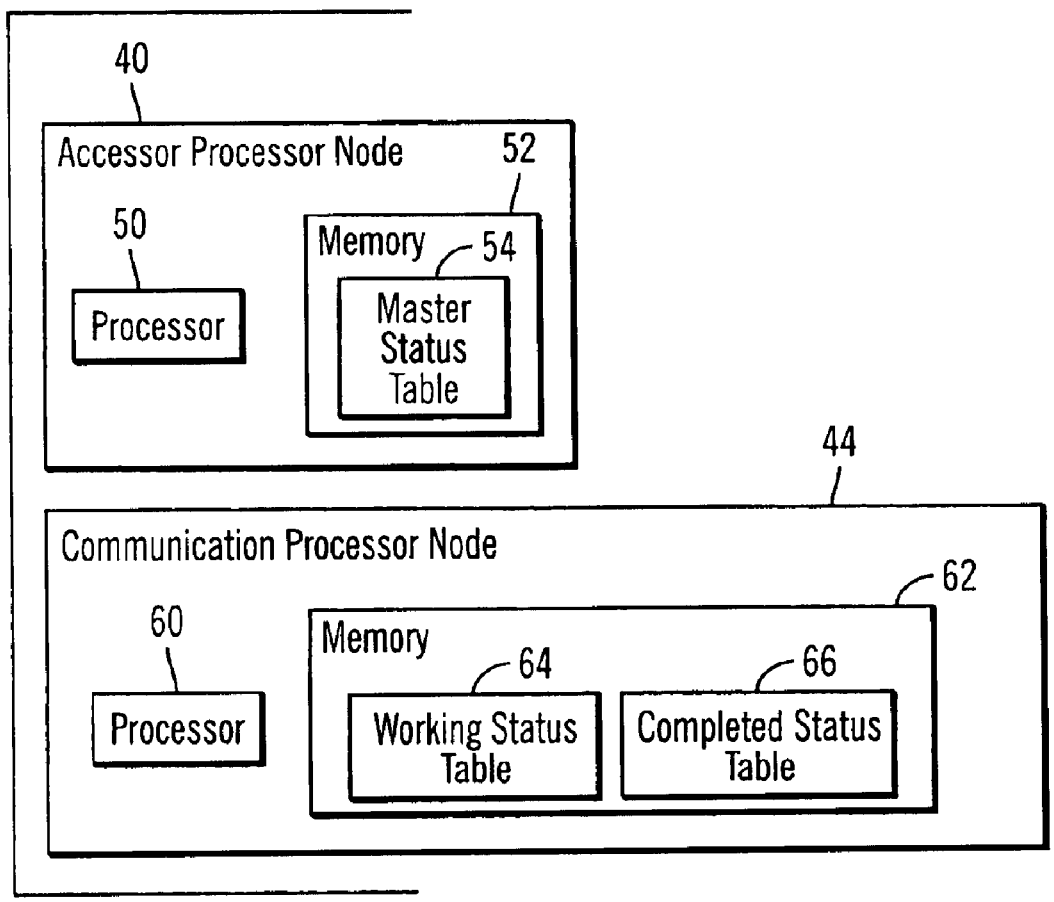
FIG. 3 illustrates components included in an accessor processor node and communication processor node in accordance with preferred embodiments of the present invention.

FIG. 3 illustrates further detail of the accessor 40 and communication 44 processor nodes. The accessor processor node 40 includes processor 50 and memory 52, which may comprise a volatile memory, non-volatile memory, cache, etc., in which a master status table 54 is maintained. This master status table 54 provides status information on library elements, e.g., gripper, storage slot, I/O slot, drive, etc., at which a particular storage cartridge may be located. A library element would have an "empty" status if no storage cartridge is available at the library element location or indicate a storage cartridge at the library element. The communication processor node 44 also includes a processor 60 and memory 62 including two status tables in memory, a working status table 64 and a completed status table 66. In preferred embodiments, whenever the library element location of a storage cartridge is determined or changes, the accessor processor node 40 updates the master status table 54 and broadcasts the update across the bus 46 to the communication processor node 44, which applies the update to the working status table 64. The communication processor node 44 returns status information to the host systems 36a, b, c from the completed status table 66.

Figure 4:
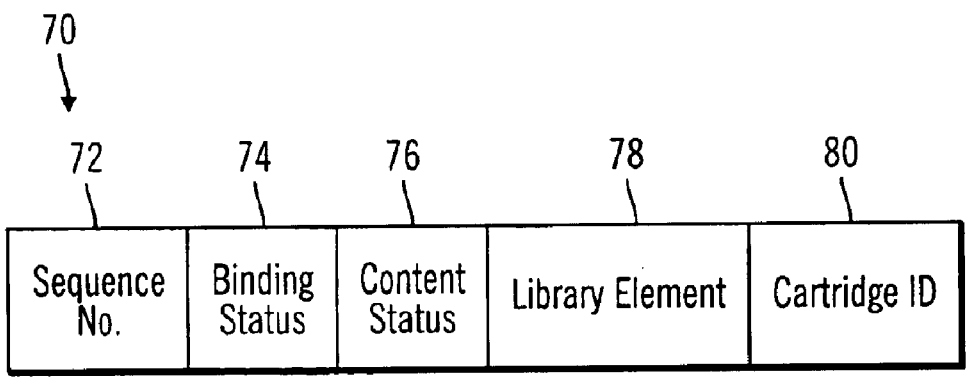
FIG. 4 illustrates fields in a status message in accordance with preferred embodiments of the present invention.

FIG. 4 illustrates fields in an update message 70 that the accessor processor node 40 transmits via direct addressing or broadcasting to the communication processor node 44 over the bus 46 after updating the local master status table 54. If there are multiple accessor processor nodes and communication processor nodes in the library system 20, then accessor processor node 40 may broadcast or individually communicate the update message 70 to all such accessor processor nodes and communication processor nodes.

The update message 70 includes a sequence number 72, which may comprise a first packet indicator, a last packet indicator, or a consecutive number in the sequence the accessor processor node 40 assigns following the last assigned number. The sequence number 72 is used for error checking to allow the communication processor node 44 to determine whether all transmitted messages have been received. In preferred embodiments, the first sequence number is assigned following initialization. A binding status field 74 indicates whether the change in the library element location for the cartridge is part of a series of changes to occur, such as a move, which involves a library element location update to the source and then to the target destination, e.g., storage slot, I/O slot, etc.

In preferred embodiments, the binding status field 74 can have one of three values: (1) "unbound", which means the update is not part of a series of location changes, such as an operation that reads the identification label of a storage cartridge or determines the content of a library element location; (2) "bound waiting", which means that the update is part of a series of yet to occur library element location changes, such as the case of the changes in a move or exchange operation; and (3) "bound not waiting" which means the location change is the last in a series of location changes, such as changing the cartridge location to the target library element location of a move or exchange operation. The "bound" status is used when two or more library element locations are affected by the move. In such case, the "bound waiting" indicates that additional library element locations need to be modified as part of an operation. The "bound not waiting" status indicates that this is the last change to occur in a series of changes. The content status field 76 indicates whether the library element identified in library element field 78 is empty or full, i.e., has a cartridge or not. A cartridge ID field 80 indicates an identifier (ID) of a storage cartridge involved in the change or operation. For instance, if the content status 76 is "full", then field 80 identifies the storage cartridge at the library element in field 78. If the content status 76 is "empty" and the binding status is "bound waiting", then the cartridge ID field 80 identifies a storage cartridge that was removed from the library element identified in field 78 as part of a move or exchange operation.

Figure 5:
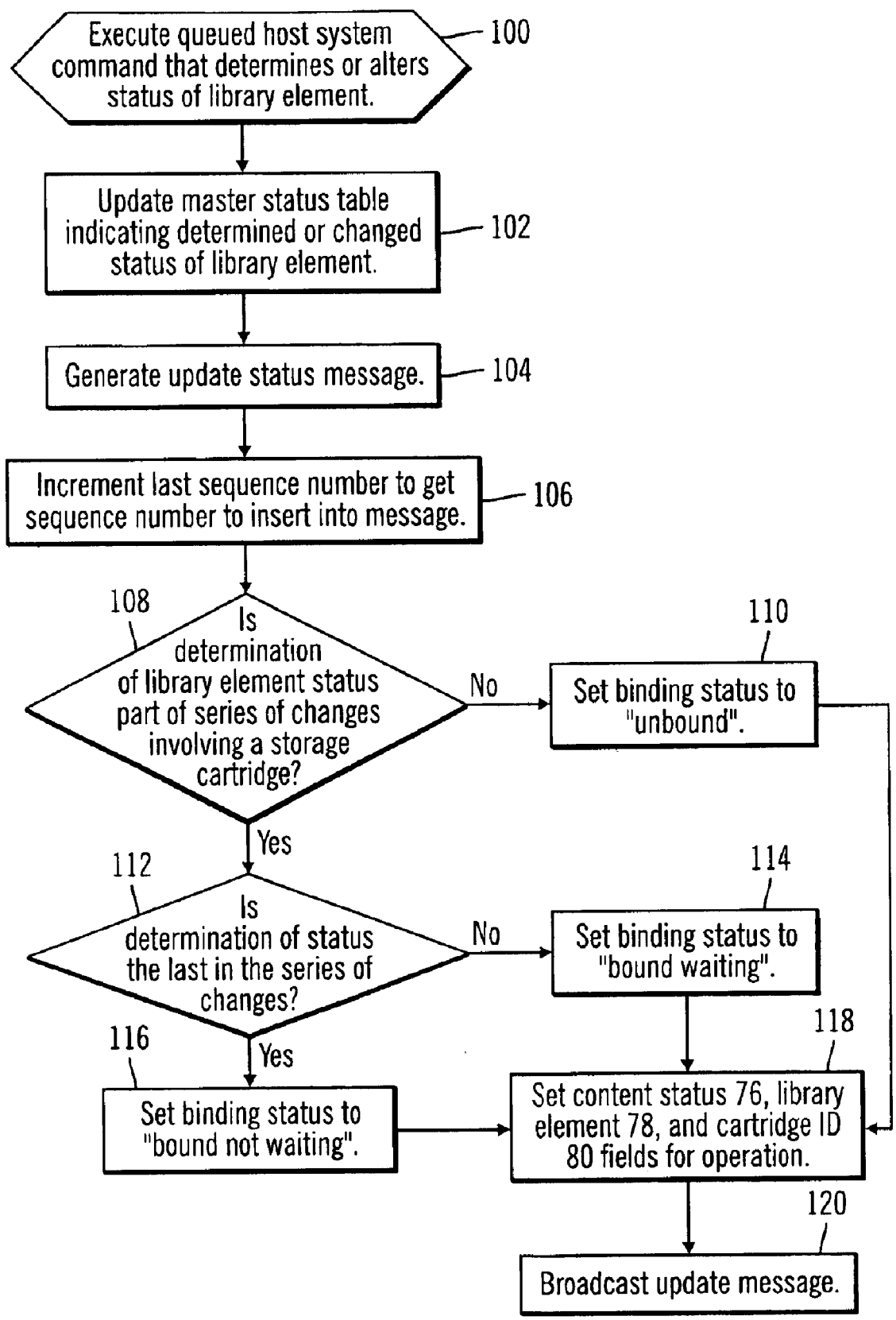
FIG. 5 illustrates logic to generate and transmit status messages in accordance with preferred embodiments of the present invention.

FIG. 5 illustrates logic implemented in the firmware of the accessor processor node 40 to provide system status information. Control begins at block 100 with the accessor processor node 40 executing a host command that alters the library element location of a storage cartridge or determines the status of a library element. After performing such an operation, the accessor processor node 40 updates (at block 102) the local master status table 54 with the information on the change to the library element or determined status of the library element. An update status message 70 is generated (at block 104). The accessor processor node 40 increments (at block 106) the last assigned sequence number to obtain the sequence number to insert in the sequence number field 72. The accessor processor node 40 farther determines (at block 108) whether the library element status is determined as pan of a series of changes to library element locations involving the cartridge, e.g., a move or exchange operation. If not, then the binding status field 74 is set (at block 110) as "unbound", indicating tat the determined status is unrelated to any previous or subsequent status changes. If the determination of the status is part of a series of status changes, such as the ease of a move or exchange operation, and if (at block 112) the determination of status is the last in a series of status changes, then the binding status field 74 is set (at block 116) to "bound not waiting"; otherwise, the binding status is set (at block 114) to "bound waiting".

After setting the binding status 74 at blocks 110, 114, or 116, the accessor processor node 40 sets (at block 118) the content status 76 and library element 78 fields to indicate whether the determined content for the library element identified in field 78 is empty or includes a cartridge. If the content status is "full", then the cartridge ID field 80 identifies the cartridge located at the library element. If the library element has "bound waiting" status, then the cartridge ID field 80 indicates the cartridge ID that is in the process of being moved from the library element. Still further, the cartridge ID field 80 may be empty if the host operation determined that there is no cartridge in the library element and the binding status is "unbound" or "bound not waiting".

The accessor processor node 40 then transmits (at block 120) the update message to the communication processor node 44, and any additional accessor and communication processor nodes, individually or as a broadcast on the bus 46.

In preferred embodiments, a single operation may affect multiple library elements. For instance, during a move operation the gripper assembly 26 may move a storage cartridge from a storage slot to a drive. This operation would change the status for both the destination drive and the storage slot from which the gripper removed the storage cartridge. In such cases, the accessor processor node 40 would generate two update messages for one operation, such as one message indicating that the content of the storage slot library element from which the cartridge was removed is empty and a subsequent message indicating that the content of the destination drive 10a, b library element is "full" with the storage cartridge that was accessed.

Figure 6:
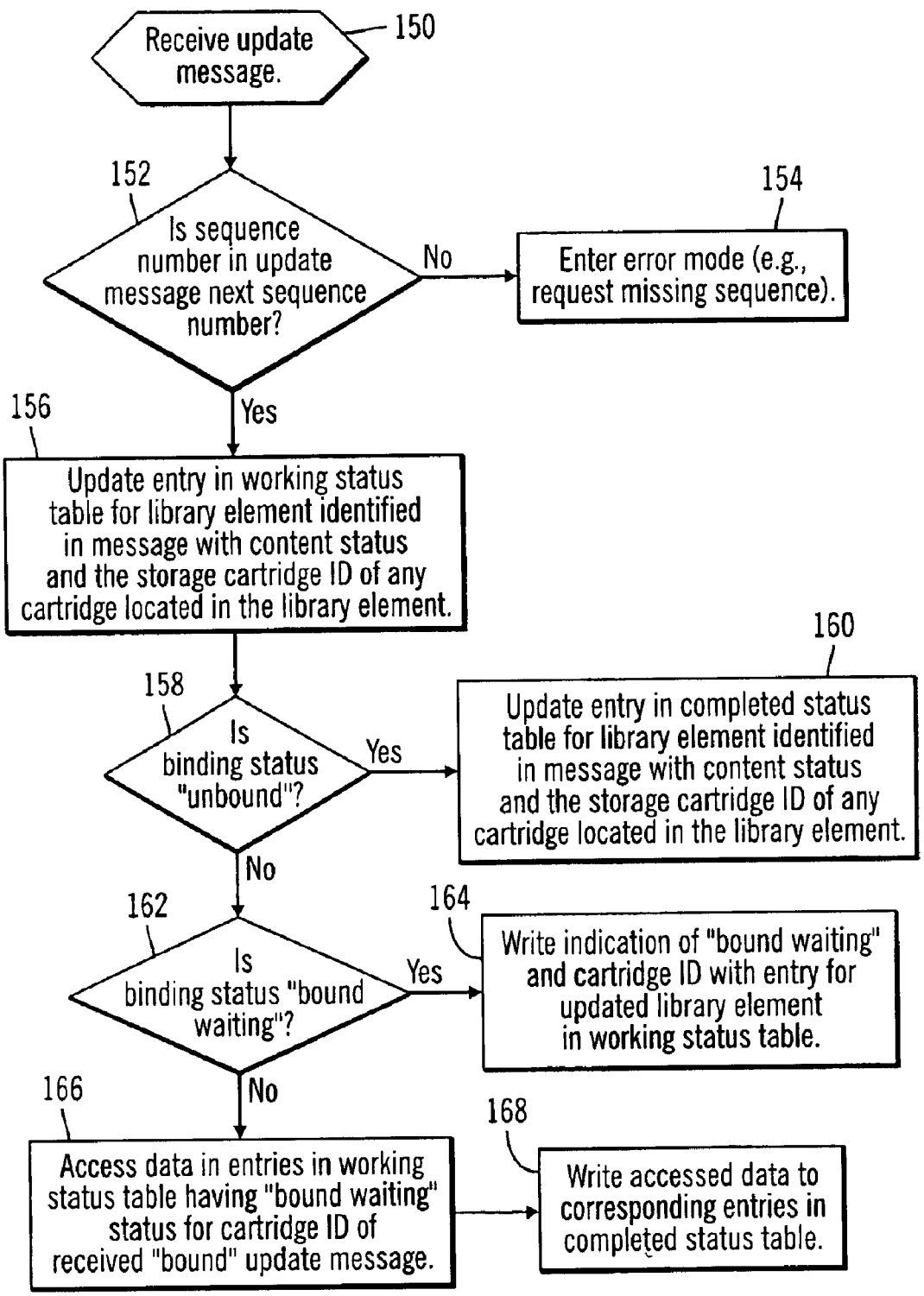
FIG. 6 illustrates logic to update status tables at a communication processor node in accordance with preferred embodiments of the present invention.

FIG. 6 illustrates logic implemented in the firmware of the communication processor node 44 to apply the update information in an update status message 70 received at block 150. If (at block 152) the sequence number 72 in the message 70 is not consecutive with respect to the last received sequence number, then a message 70 may have been lost as messages have been received out of sequence. In such case, the communication processor node 44 enters (at block 154) an error mode. In this error mode, the communication processor node 44 may request the messages having the missing sequence numbers from the accessor processor node 40, or request the entire master status table 54. If the sequence number 72 of the received message 70 is correct, then the communication processor node 44 updates (at block 156) the entry in the working status table 64 for the library element location identified in field 78 with the content status 76, e.g., "full" or "empty", and the identification of any storage cartridges at the library element.

If (at block 158) the binding status 72 is "unbound", e.g., a library element location was scanned to determine the content status at the library element location, then the communication processor node 44 updates (at block 160) the entry in the completed status table 66 corresponding to the library element location indicated in field 78 with the content status indicated in field 76 and the storage cartridge ID in field 80 if the content status is "full". If (at block 162) the binding status is "bound waiting", then the communication processor node 44 writes (at block 164) indication of "bound waiting" and the cartridge ID subject to the bound operation, i.e., the cartridge being moved or exchanged, with the entry in the working status table 64. The cartridge ID and "bound waiting" status are used to identify all entries in the working status table 64 associated with the host library operation resulting in the bound status. If the binding status 74 is "bound not waiting", then the communication processor node 44 accesses (at block 166) all library element entries in the working status table 64 having a "bound waiting" status for the cartridge ID in the field 80 in the received "bound not waiting" message. The communication processor node 44 then writes (at block 168) the data in the entries accessed from the working status table 64 to the corresponding entries for those library elements in the completed status table 66.

In this way, the completed status table 66 which is used to provide status information to the host systems 36*a, b, c,* is not updated until all the steps that are part of a series of related operations involving movement of a library cartridge to multiple library element locations have completed. The logic of FIG. 6 ensures coherency of data in the completed status table 66 to avoid the situation where inconsistent status is indicated. For instance, if a host operation seeks to move storage cartridge 1 from storage slot A to storage slot B, then at the time of the first operation where the gripper assembly 26 removes the storage cartridge 1 from storage slot A, the completed status table 66 indicates that storage cartridge 1 is located in storage slot A and that the gripper assembly 26 is empty. The first update message would indicate that the storage slot A is empty. If the coherency logic of FIG. 6 is not followed, and this message is applied to the completed status table 66 to set the status of the storage slot A element to empty, then at that moment no library element entry in the completed status table 66 has storage cartridge A. If the communication processor node 44 returns the completed status table 66 to a host system 36*a, b, c* before receiving an update message indicating that the storage slot B has the storage cartridge 1, then the status provided to the host system 36*a, b, c* will not show the location of storage cartridge 1 at any library element. For this reason, the logic of FIG. 6 keeps related operations bound together to require that they all be written at the same time to the completed status table 66 to avoid coherency problems in the completed status table 66 and information returned to the host systems.

With the preferred embodiments, host system 36*a, b, c* status requests do not consume bus 46 bandwidth or overload the accessor processor node 40 because the host system 36*a, b, c* accesses the status information from the completed status table 66 maintained at the communication processor node 44, which is the interface between the library system 20 and the host systems 36*a, b, c*. In fact, with preferred embodiments, update messages are transmitted over the bus 46 at the rate of mechanical operations, such as moving a storage cartridge from one library element location to another, or reading the identification label of a storage cartridge. Thus, the update messages do not consume significant bus 46 bandwidth because the frequency of such messages is dependant upon the occurrence of an electromechanical operation in the tape library 20.

Following are some alternative implementations for the preferred embodiments.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

In preferred embodiments, the processor nodes comprised processors that operated under firmware control. In alternative embodiments, the processor nodes may be implemented as hardware logic, such as logic on an integrated circuit chip, e.g., an ASIC, FPGA, etc.

The preferred logic of FIGS. 5–6 describe specific operations occurring in a particular order. In alternative embodiments, certain of the logic operations may be performed in a different order, modified or removed and still implement preferred embodiments of the present invention. Morever, steps may be added to the above described logic and still conform to the preferred embodiments.

Preferred embodiments were described with respect to providing status to processor nodes in a tape library system. However, the preferred embodiment technique for providing status is not limited to tape library systems, and can be used in any other system where different system components can be implemented as separate processor nodes. For instance, the system may comprise any electromechanical machine, where different operations or components of the machine have their own processor node, and wherein the communication processor node providing a communication interface to the machine caches the status information to provide to requesting external computers.

In preferred embodiments, the central processor node, e.g., the accessor processor node, provided a status message after the occurrence of an operation with respect to a library element, e.g., determining whether a storage cartridge is at the library element, identifying the storage cartridge, etc. In non-tape library systems, the central processor node may generate a status message after the occurrence of any type of system operation that affects the status of a component in the system or an operation that determines the status of a system component.

In preferred embodiments, the accessor processor node 40 generated and transmitted an update message 70 after the occurrence of one particular operation related to a library element or storage cartridge, even if the operation is part of a larger operation, e.g., moving or exchanging a storage cartridge. In alternative embodiments, the accessor processor node 40 or processor node generating the message may generate and buffer multiple messages, and then later transmit all buffered update messages to the processor node maintaining the status table, e.g., the communication processor node 44.

In preferred embodiments, the working 64 and completed 66 status tables are cached at the communication processor node. In alternative embodiments, the tables 64 and 66 may be cached or stored at an alternative location in the library system 20.

In preferred embodiments the working 64 and completed 66 status tables are implemented in separate table data structures. However, those skilled in the art will appreciate that the tables 64 and 66 may be implemented in alternative data structures, such as a single table, more than two tables, etc.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer implemented method for providing status information in a system comprised of multiple components, comprising:
   receiving, at a first processor node, status information indicating a state of a system component;
   generating a status message, with the first processor node, indicating the state of the system component;
   transmitting, with the first processor node, the status message to a second processor node;
   determining, with the second processor node, whether the status message has a first sequence number that is consecutive with respect to a last received status message having a second sequence number;
   when it is determined that the first sequence number of the status message is not consecutive, determining, with the second processor node, that a previously generated status message having a third sequence number was not received by the second processor node; and
   when it is determined that the first sequence number of the status message is consecutive,
      updating, with the second processor node, status information maintained by the second processor node with the state of the system component indicated in the status message; and
      returning status information maintained by the second processor node to a request for status.

2. The method of claim 1, wherein the state of the system component is capable of being altered by an electromechanical operation related to the system component.

3. The method of claim 1, wherein the status message is generated for one received status information indicating the state of one system component.

4. The method of claim 1, wherein the status information maintained by the second processor node is cached in a memory at the second processor node.

5. The method of claim 1, wherein generating the status message further comprises:
   determining whether the state of the system component indicated in the received status information is affected by an operation that is part of a series of related operations that will affect the state of one or more system components; and
   if the state indicated in the received status information is affected by an operation that is pert of the series of related operations, then indicating in the generated message that the state of the system component is bound to the series of related operations.

6. The method of claim 5, wherein the status information updated by the second processor node comprises first status information, further comprising:
   updating second status information with the second processor node with the state of the system component indicated in the transmitted status information if the status information indicates that the state of the system component is not bound to the series of related operations.

7. A computer implemented method for providing status information in a system comprised of multiple components, comprising:
   receiving, at a first processor node, status information indicating a state of a system component;
   generating a status message, with the first processor node, indicating the state of the system component, wherein generating the status message further includes:
      determining whether the state of the system component indicated in the received status information is affected by an operation that is part of a series of related operations that will affect the state of one or more system components; and
      if the state indicated in the received status information is affected by an operation that is part of the series of related operations, then indicating in the generated message that the state of the system component is bound to the series of related operations;
   transmitting, with the first processor node, the status message to a second processor node;
   updating, with the second processor node, status information maintained by the second processor node with die state of the system component indicated in the status message, wherein the status information undated by the second processor node comprises first status information, and further including:
      updating second status information with the second processor node with the state of the system component indicated in the transmitted status information if the status information indicates that the state of the system component is not bound to the series of related operations;
   returning status information maintained by the second processor node to a request for status;
   determining whether the state of the system component indicated in the received status information is affected by an operation that is a last operation in the series of related operations that will affect the state of one or more system components;
   if the state indicated in the received status information is affected by an operation that is the last in the series of related operations, then indicating in the generated message that the state of the system component is bound complete; and writing, with the second processor node, the states of the system component indicated as bound and the state indicated as bound complete that are affected by thy series of related operations to the second status information, wherein status information is returned to the request for status from the second status information.

8. The method of claim 7, wherein the second status information is cached at the second processor node.

9. A computer implemented method for providing status information in a system comprised of multiple components, comprising:

receiving, at a first processor node, status information indicating a state of a system component;

generating a status message, with the first processor node, indicating the state of the system component;

transmitting, with the first processor node, the status message to a second processor node;

updating, with the second processor node, status information maintained by the second processor node with the state of the system component indicated in the status message; and returning status information maintained by the second processor node to a request for status, wherein the generated status message further indicates a sequence number following an immediate previous sequence number included in an immediately preceding transmitted status message, further comprising:

before updating the status information at the second processor node, determining, with the second processor node, whether the sequence number included in the status message immediately follows a sequence number included in an immediately preceding status message; and entering, with the second processor node, an error mode to recover status messages associated with sequence numbers between the sequence number included in the immediately preceding transmitted message and the sequence number in the transmitted status message if the sequence number included in the status message does not immediately follow the sequence number in the immediately preceding transmitted message.

10. The method of claim 1, wherein the first and second processor nodes further control at least one system component to control system related operations.

11. The method of claim 1, wherein the first and second processor nodes communicate over a bus interface, wherein the request for status is received from a computer system over a communication line and interface to the second processor node, and wherein the second processor node returns status information maintained by the second processor node over the interface and communication line to the computer system.

12. The method of claim 1, wherein the first processor node controls a storage library accessor capable of accessing a storage cartridge from one library element location, obtaining information on a state of the library elements, and moving a storage cartridge from one library element to another library element, and wherein the second processor node controls a communication interface providing access to a computer system over a communication line, wherein the second processor node returns requested status information to the computer system requesting the status information over the communication, line.

13. A system for providing status information, comprising:

means for receiving, at a first processor node, status information indicating a state of a system component;

means for generating a status message, with the first processor node, indicating the state of the system component;

means for transmitting, with the first processor node, the status message to a second processor node;

means for determining, with the second processor node, whether the status message has a first sequence number that is consecutive with respect to a last received status message having a second sequence number;

when it is determined that the first sequence number of the status message is not consecutive, means for determining, with the second processor node, that a previously generated status message having a third sequence number was not received by the second processor node; and when it is determined that the first sequence number of the status message is consecutive, means for updating, with the second processor node, status information maintained by the second processor node with the state of the system component indicated in the status message; and means for returning status information maintained by the second processor node to a request for status.

14. The system of claim 13, wherein the state of the system component is capable of being altered by an electromechanical operation related to the system component.

15. The system of claim 13, wherein the status message is generated for one received status information indicating the state of one system component.

16. The system of claim 13, wherein the status information maintained by the second processor node is cached in a memory at the second processor node.

17. The system of claim 13, wherein the means for generating the status message further performs:

determining whether the state of the system component indicated in the received status information is affected by an operation that is part of a series of related operations that will affect the state of one or more system components; and if the state indicated in the received status information is affected by an operation that is part of the series of related operations, then indicating in the generated message that the state of the system component is bound to the series of related operations.

18. The system of claim 17, wherein the status information updated by the second processor node comprises first status information, further comprising:

means for updating second status information with the second processor node with the state of the system component indicated in the transmitted status information, if the status information indicates that the state of the system component is not bound to the series of related operations.

19. A system for providing status information, comprising:

means for receiving, at a first processor node, status information indicating a state of a system component;

means for generating a status message, with the first processor node, indicating the state of the system component, wherein the means for generating the status message further performs:

determining whether the state of the system component indicated in the received status information is affected by an operation that is part of a series of related operations that will affect the state of one or more system components; and if the state indicated in the received status information is affected by an operation that is pan of the series of related operations, then indicating in the generated message that the state of the system component is bound to the series of related operations;

means for transmitting, with the first processor node, the status message to a second processor node;

means for updating, with the second processor node, status information maintained by the second processor node with the state of the system component indicated in the status message, wherein the status information undated by the second processor node comprises first status information, and further including:

means for updating second status information with the second processor node with the state of the system component indicated in the transmitted status information if the status information indicates that the state of the system component is not bound to the series of related operations;

means for returning status information maintained by the second processor node to a request for status means for determining whether the state of the system component indicated in the received status information is affected by an operation that is a last operation in the series of related operations that will affect the state of one or mote system components;

means for indicating in the generated message that the state of the system component is bound complete if the state indicated in the received status information is affected by an operation that is the last in the series of related operations; and means for writing, with the second processor node, the states of the system component indicated as bound and the state indicated as bound complete that are affected by the series of related operations to the second status information, wherein status information is returned to the request for status from the second status information.

20. The system of claim 19, wherein the second status information is cached at the second processor node.

21. A system for providing status information, comprising:

means for receiving, at a first processor node, status information indicating a state of a system component;

means for generating a status message, with the first processor node, indicating the state of the system component;

means for transmitting, with the first processor node, the status message to a second processor node;

means for updating, with the second processor node, stabs information maintained by the second processor node with the state of the system component indicated in the status message; and means for returning status information maintained by the second processor node to a request for status, wherein the generated status message further indicates a sapience number following an immediate previous sequence number included in an immediately preceding transmitted status message, further comprising:

means for determining, with the second processor node, whether the sequence number included in the status message immediately follows a sequence number included in an immediately preceding status message before updating the status information at the second processor node; and means for entering, with the second processor node, an error mode to recover stabs messages associated with sequence numbers between the sequence number included in the immediately preceding transmitted message and the sequence number in the transmitted status message if the sequence number included in the status message does not immediately follow the sequence number in the immediately preceding transmitted message.

22. The system of claim 13, wherein the first and second processor nodes further control at least one system component to control system related operations.

23. The system of claim 13, wherein the first and second processor nodes communicate over a bus interface, wherein the request for status is received from a computer system over a communication line and interface to the second processor node, and wherein the second processor node returns status information maintained by the second processor node over the interface and communication line to the computer system.

24. The system of claim 13, wherein the first processor node controls a storage library accessor capable of accessing a storage cartridge from one library element location, obtaining information on a state of the library elements, and moving a storage cartridge from one library element to another library element, and wherein the second processor node controls a communication interface providing access to a computer system over a communication line, wherein the second processor node returns requested status information to the computer system requesting the status information over the communication line.

25. An article of manufacture for providing status information in a system comprised of multiple components, wherein the article of manufacture comprises code implemented in an electronic readable medium capable of causing a first and second processing nodes to perform:

receiving, at a first processor node, status information indicating a state of a system component;

generating a status message, with the first processor node, indicating the state of the system component;

transmitting, with the first processor node, the status message to a second processor node;

determining, with the second processor node, whether the status message has a first sequence number that is consecutive with respect to a last received status message having a second sequence number;

when it is determined that the first sequence number of the status message is not consecutive, determining, with the second processor node, that a previously generated status message having a third sequence number was not received by the second processor node; and when it is determined that the first sequence number of the status message is consecutive,
updating, with the second processor node, status information maintained by the second processor node with the state of the system component indicated in the status message; and
returning status information maintained by the second processor node to a request for status.

26. The article of manufacture of claim 25, wherein the state of the system component is capable of being altered by an electro-mechanical operation related to the system component.

27. The article of manufacture of claim 25, wherein the status message is generated for one received status information indicating the state of one system component.

28. The article of manufacture of claim 25, wherein the status information maintained by the second processor node is cached in a memory at the second processor node.

29. The article of manufacture of claim 25, wherein generating the status message further comprises:

determining whether the state of the system component indicated in the received status information is affected by an operation that is part of a series of related operations that will affect the state of one or more system components; and if the state indicated in the received status information is affected by an operation that is part of the series of related operations, then indicating in the generated message that the state of the system component is bound to the series of related operations.

30. The article of manufacture of claim 29, wherein the stabs information updated by the second processor node comprises first status information, further comprising:

updating second status information with the second processor node with the state of the system component indicated in the transmitted status information if the status information indicates that the state of the system component is not bound to the series of related operations.

31. An article of manufacture for providing status information in a system comprised of multiple components, wherein the article of manufacture comprises code implemented in an electronic readable medium capable of causing a first and second processing nodes to perform:

receiving, at a first processor node, status information indicating a state of a system component;

generating a status message, with the first processor node, indicating the state of the system component, wherein generating the status message further includes:

determining whether the state of the system component indicated in the received status information is affected by an operation that is part of a series of related operations that will affect the state of one or more system components; and if the state indicated in the received status information is affected by an operation that is part of the series of related operations, then indicating in the generated message that the state of the system component is bound to the series of related operations;

transmitting, with the first processor node, the status message to a second processor node;

updating, with the second processor node, status information maintained by the second processor node with the state of the system component indicated in the status message, wherein the status information updated by the second processor node comprises first status information, and further including:

updating second status information with the second processor node with the state of the system component indicated in the transmitted status information if the status information indicates that the state of the system component is not bound to the series of related operations;

returning status information maintained by the second processor node to a request for status;

determining whether the state of the system component indicated in the received status information is affected by an, operation that is a last operation in the series of related operations that will affect the state of one or more system components;

if the state indicated in the received status information is affected by an operation that is the last in the series of related operations, then indicating in the generated message that the state of the system component is bound complete; and writing, with the second processor node, the states of the system component indicated as bound and the state indicated as bound complete that are affected by the series of related operations to the second status information, wherein status information is returned to the request for status from the second status information.

32. The article of manufacture of claim 31, wherein the second status information is cached at the second processor node.

33. An article of manufacture for providing status information in a system comprised of multiple components, wherein the article of manufacture comprises code implemented in an electronic readable medium capable of causing a first and second processing nodes to perform:

receiving, at a first processor node, status information indicating a state of a system component;

generating status message, with the first processor node, indicating the state of the system component;

transmitting, with the first processor node, the status message to a second processor node;

updating, with the second processor node, status information maintained by the second processor node with the state of the system component indicated in the status message; and returning status information maintained by the second processor node to a request for status, wherein the generated status message further indicates a sequence number following an immediate previous sequence number included in an immediately preceding transmitted status message, thither comprising:

before updating the status information at the second processor node, determining with the second processor node, whether the sequence number included in the status message immediately follows a sequence number included in an immediately preceding status message; and entering, with the second processor node, an error mode to recover status messages associated with sequence numbers between the sequence number included in the immediately preceding transmitted message and the sequence number in the transmitted status message if the sequence number included in the status message does not immediately follow the sequence number in the immediately preceding transmitted message.

34. The article of manufacture of claim 25, wherein the first and second processor nodes further control at least one system component to control system related operations.

35. The article of manufacture of claim 25, wherein the first and second processor nodes communicate over a bus interface, wherein the request for status is received from a computer system over a communication line and interface to the second processor node, and wherein the second processor node returns status information maintained by the second processor node over the interface and communication line to the computer system.

36. The article of manufacture of claim 25, wherein the first processor node controls a storage library accessor capable of accessing a storage cartridge from one library element location, obtaining information on a state of the library elements, and moving a storage cartridge from one library element to another library element, and wherein the second processor node controls a communication interface providing access to a computer system over a communication line, wherein the second processor node returns requested status information to the computer system requesting the status information over the communication line.

* * * * *